United States Patent
Sato et al.

(10) Patent No.: US 6,893,273 B2
(45) Date of Patent: May 17, 2005

(54) TERMINAL STRUCTURE OF CABLE WITH SHIELD LAYER

(75) Inventors: Noboru Sato, Tokyo (JP); Michiaki Shimizu, Tokyo (JP)

(73) Assignee: Hitachi Cable, Ltd., Tokyo (JP)

( * ) Notice: Subject to any disclaimer, the term of this patent is extended or adjusted under 35 U.S.C. 154(b) by 0 days.

(21) Appl. No.: 10/690,831

(22) Filed: Oct. 23, 2003

(65) Prior Publication Data

US 2004/0115975 A1 Jun. 17, 2004

(30) Foreign Application Priority Data

Oct. 29, 2002 (JP) .......................... 2002-314856

(51) Int. Cl.⁷ .............................. H01R 13/648
(52) U.S. Cl. .................... 439/98; 439/932; 439/730; 174/65 R
(58) Field of Search .............. 439/578, 573–572, 439/569, 583–585, 161, 730, 874, 932, 98, 610; 174/65 R

(56) References Cited

U.S. PATENT DOCUMENTS

| | | | | |
|---|---|---|---|---|
| 3,054,981 A | * | 9/1962 | Malek et al. | 439/585 |
| 3,142,721 A | * | 7/1964 | Long | 174/65 R |
| 4,173,385 A | * | 11/1979 | Fenn et al. | 439/583 |
| 4,804,338 A | * | 2/1989 | Dibble et al. | 439/583 |
| 5,083,943 A | * | 1/1992 | Tarrant | 439/583 |
| 5,118,313 A | * | 6/1992 | Delalle | 439/730 |

FOREIGN PATENT DOCUMENTS

| | | | |
|---|---|---|---|
| JP | 3-78980 | * | 4/1991 |
| JP | 2000-294344 | | 10/2000 |

* cited by examiner

*Primary Examiner*—Tho D. Ta
(74) *Attorney, Agent, or Firm*—McGinn & Gibb, PLLC

(57) ABSTRACT

A terminal structure of cable with shield layer has: a metal tube one end of which is inserted between the insulation and the shield layer that are exposed by peeling a jacket of the cable and the other end of which is inserted into a penetrating hole in the attached object; a metal sleeve that is disposed on the shield layer and is fastened to make the one end of the metal tube closely contact the insulation; a heat shrinkage tube that covers the metal tube, the metal sleeve and the jacket and has a hot-melt layer formed at the inside of the heat shrinkage tube; and a shield member that is disposed on the other end of the metal tube such that the shield member closely contacts the wall of the penetrating hole to give a water-tightness therebetween.

3 Claims, 3 Drawing Sheets

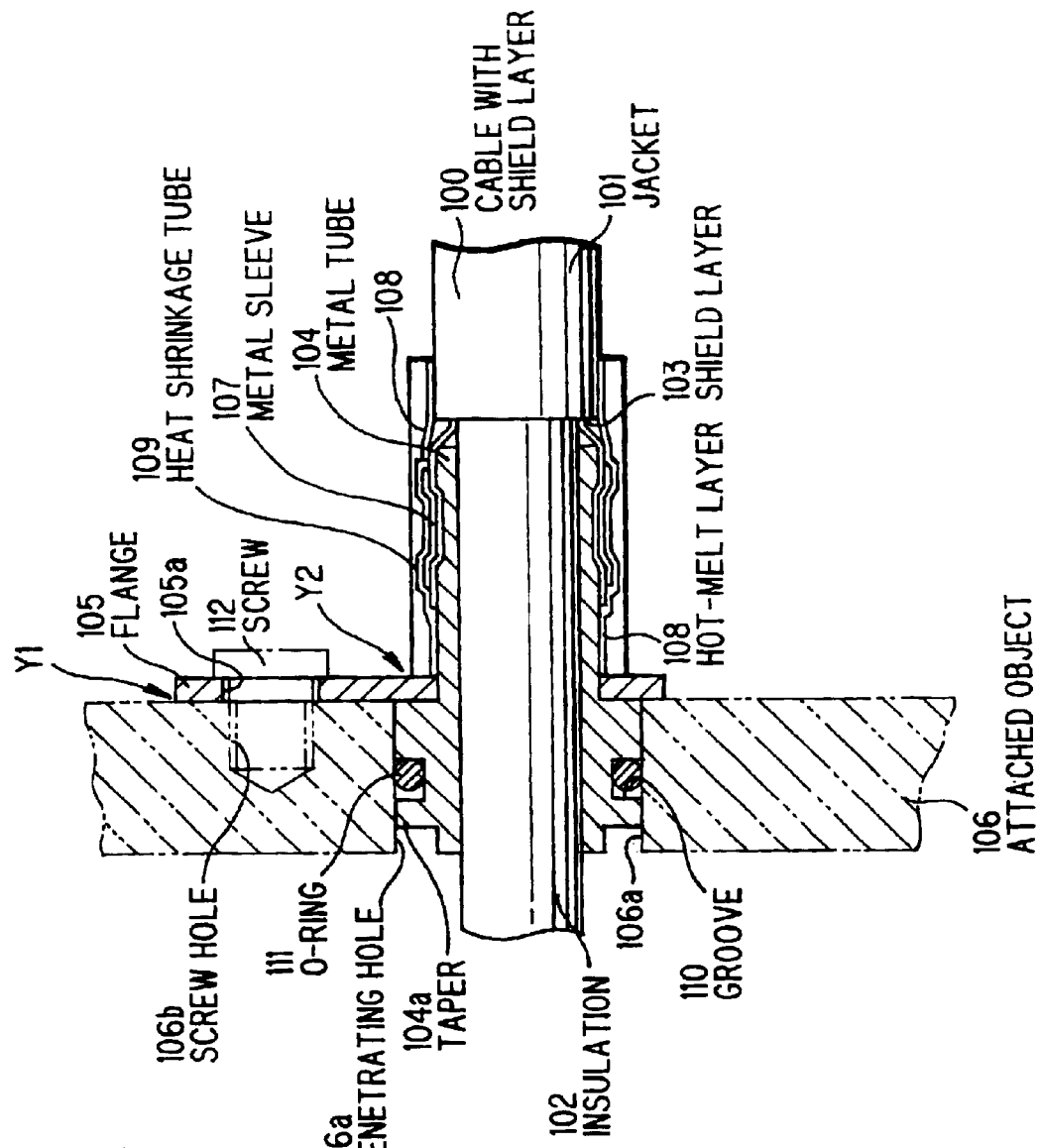
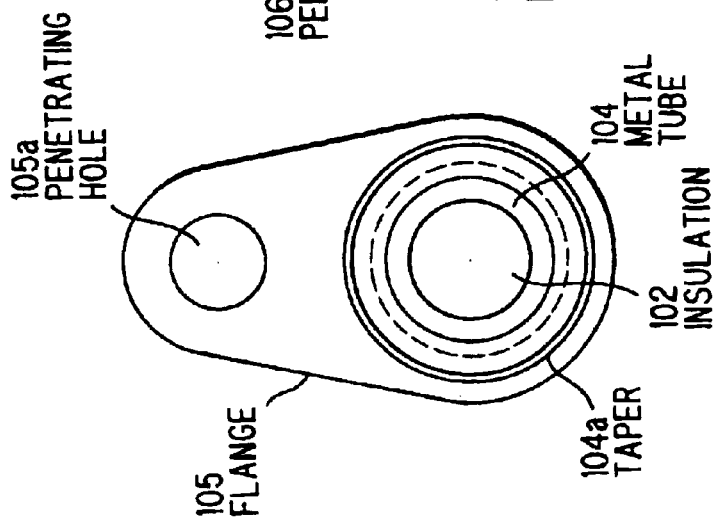

TERMINAL STRUCTURE OF CABLE WITH SHIELD LAYER

The present application is based on Japanese patent application No. 2002-314856, the entire contents of which are incorporated herein by reference.

BACKGROUND OF THE INVENTION

1. Field of the Invention

This invention relates to the terminal structure of a cable with shield layer that is used to interconnect with an electric or electronic device, such as a battery, inverter and motor of electric vehicle, which needs a waterproof structure.

2. Description of the Related Art

FIG. 1 shows an example of conventional terminal structure of a cable with shield layer to interconnect between battery and inverter or between inverter and motor of electric vehicle. In this terminal structure, a shield member 4 closely contacts a first sealing member 3 protruding from a housing 2 in the axis direction and a second sealing member 5 closely contacts the shield member 4. A hole 28 on the housing side communicates with a hole 40 of the shield member in the range that allows a protrusion 32 and a concave (engaging) portion 31 to move. The housing 2 is composed of a flange 11 and ring walls 14, 15. The ring wall 15 contacts a hole wall 51 while being fitted to a first ring portion 37 of the shield member 4. The second sealing member 5 is fitted outside the first sealing member 3 being fitted to a second ring portion 38 of the shield member 4. A shield cable 6 is fitted to a third ring portion 39 of the shield member 4 with a shield sleeve 8. Also, there are provided a drain hole 23, a stopper holder 10 and a cushion ring 9. Due to this structure, an excellent water-tightness can be obtained and the shield layer can be grounded surely (for example, Japanese patent application laid-open No.2000-294344).

However, the conventional terminal structure of cable with shield layer needs a number of parts and is complicated. Therefore, the manufacturing cost becomes high and it takes a long time to attach the cable with shield layer to an attached object while securing a given waterproof structure and grounding structure.

SUMMARY OF THE INVENTION

It is an object of the invention to provide a terminal structure of cable with shield layer that the attaching of the cable with shield layer to an attached object can be completed in a short time while securing a given waterproof structure and grounding structure and that the manufacturing cost can be lowered.

According to the invention, a terminal structure of cable with shield layer for attaching the cable to an attached object in water-tightness while grounding a shield layer formed on an insulation of the cable, comprises:

a metal tube one end of which is inserted between the insulation and the shield layer that are exposed by peeling a jacket of the cable and the other end of which is inserted into a penetrating hole in the attached object;

a metal sleeve that is disposed on the shield layer and is fastened to make the one end of the metal tube closely contact the insulation;

a heat shrinkage tube that covers the metal tube, the metal sleeve and the jacket and has a hot-melt layer formed at the inside of the heat shrinkage tube, the hot-melt layer being solidified by heat in the heating and shrinkage of the heat shrinkage tube; and a shield member that is disposed on the other end of the metal tube such that the shield member closely contacts the wall of the penetrating hole to give a water-tightness therebetween.

BRIEF DESCRIPTION OF THE DRAWINGS

The preferred embodiments according to the invention will be explained below referring to the drawings, wherein:

FIG. 2A is a cross sectional view showing a terminal structure of cable 100 with shield layer in the preferred embodiment according to the invention;

FIG. 2B is aback view showing a flange 105 in FIG. 2A while viewing from the inside of an attached object 106;

DETAILED DESCRIPTION OF THE PREFERRED EMBODIMENTS

Figure 1:
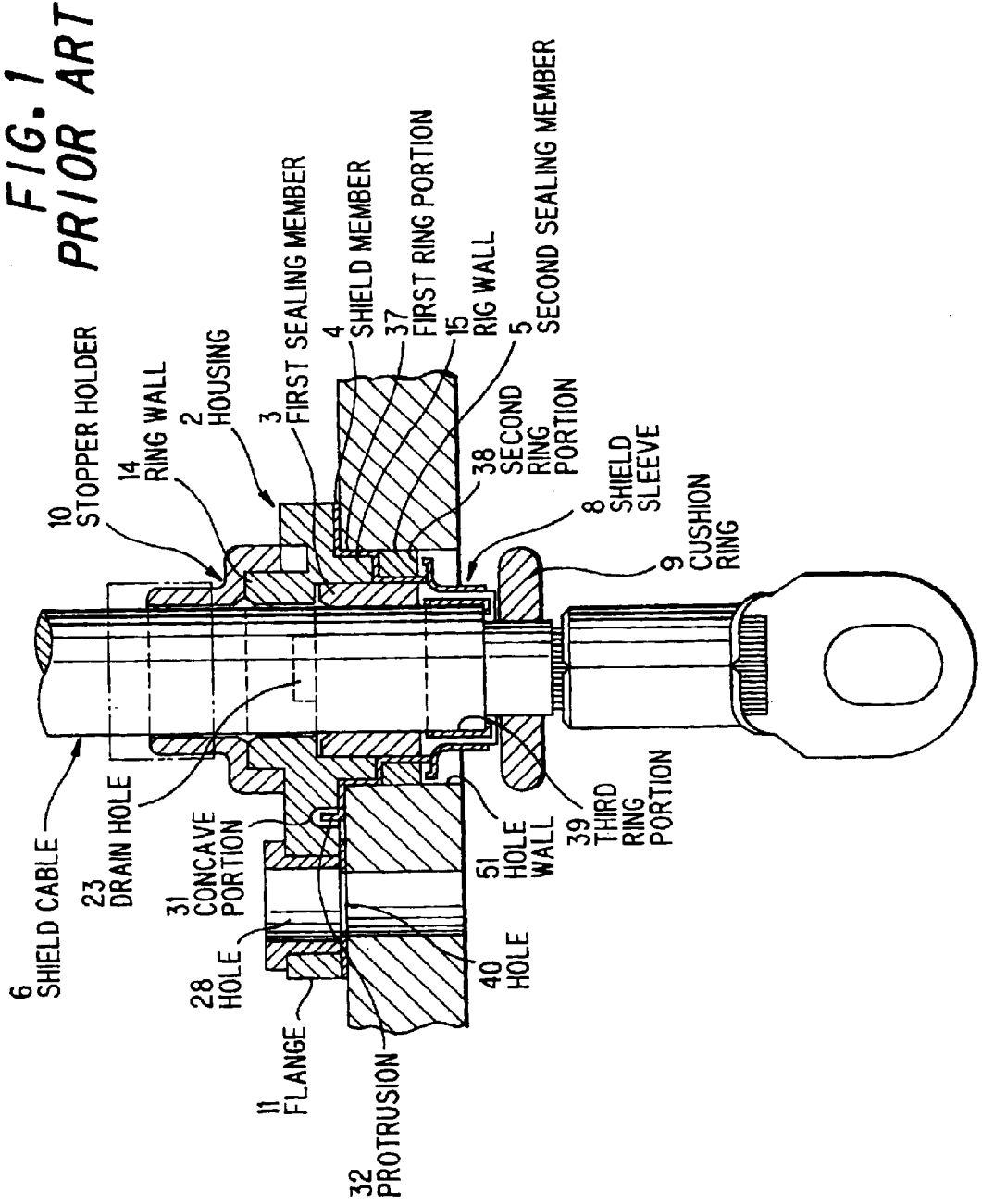
FIG. 1 is a cross sectional view showing the conventional terminal structure of cable with shield layer.

FIG. 2A is a cross sectional view showing a terminal structure of cable 100 with shield layer in the preferred embodiment according to the invention. FIG. 2B is a back view showing a flange 105 in FIG. 2A while viewing from the inside of an attached object 106.

The terminal structure of cable 100 with shield layer is constructed by such that one end of a metal tube 104 as housing is inserted between an insulation 102 and a shield layer 103, which are exposed by peeling a jacket 101 of the cable 100, the metallic flange 105 is incorporated into the metal tube 104, the other end of metal tube 104 is inserted into a penetrating hole 106a of the attached object 106 as a panel of electronic device, and the flange 105 is fixed to the attached object 106 by a screw 112 to be fitted into a screw hole 106a of the attached object 106.

In detail, the shield layer 103 is secured to the metal tube 104 by disposing a metal sleeve (ferrule) 107 around the shield layer 103 covering one end of the metal tube 104 and then fastening it. Furthermore, between the flange 105 positioned outside the attached object 106 and one end of the jacket 101, a heat shrinkage tube 109 with hot-melt layer 108 formed at the inside is attached to cover the metal sleeve 107, shield layer 103, jacket 101 and metal tube 104.

The heat shrinkage tube 109 is shrunk by cooling after heating at a predetermined temperature. The hot-melt layer 108 formed at the inside of heat shrinkage tube 109 is solidified after being melted by heat in the heating and shrinkage. Thereby, it wraps the metal sleeve 107, shield layer 103, jacket 101 and metal tube 104 from outside while being shrunk so as to give water-tightness to between the metal tube 104 and the heat shrinkage tube 109 and between the shield layer 103 and the heat shrinkage tube 109.

A groove 110 is formed on the circumference of part of the metal tube 104 where the metal tube 104 is inserted to the penetrating hole 106a of attached object 106, and an O-ring 111 is fitted into the groove 110. The O-ring 111 closely contacts the inside wall of penetrating hole 106a and serves to block water to invade a space between the attached object 106 and the flange 105 as shown by arrow Y1 in FIG. 2A and a space between the flange 105 and the heat shrinkage tube 109 as shown by arrow Y2 in FIG. 2A. Namely, it gives a waterproof structure. The metal tube 104 has a taper 104a on the tip portion so as to facilitate the insertion of the metal tube 104 into the penetrating hole 106a.

Figure 3A:
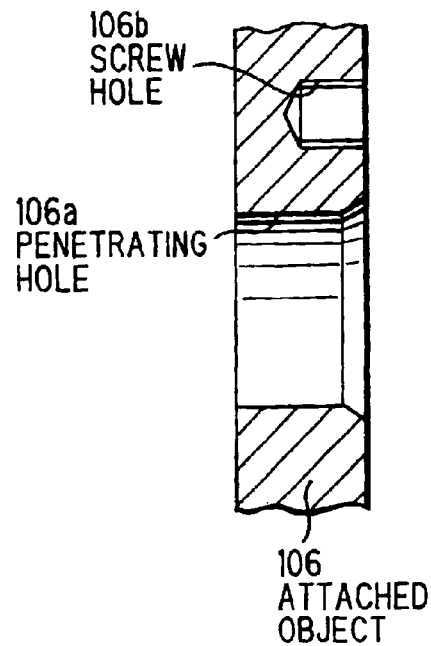
FIG. 3A is a partial cross sectional view showing a penetrating hole 106a and a screw hole 106b in FIG. 2A.
Figure 3B:
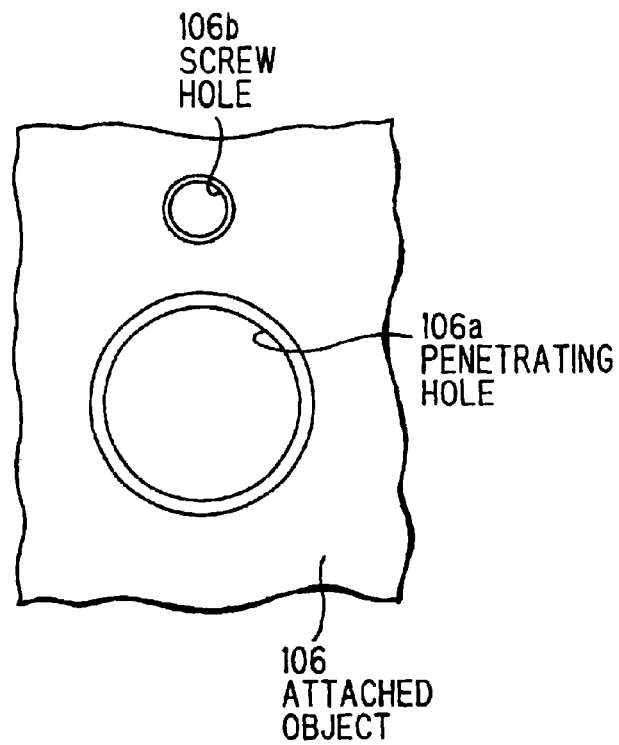
FIG. 3B is a partial top view showing the penetrating hole 106a and screw hole 106b in FIG. 2A.

FIG. 3A is a partial cross sectional view showing the penetrating hole 106a and screw hole 106b. FIG. 3B is a partial top view showing the penetrating hole 106a and screw hole 106b.

As shown in FIGS. 3A and 3B, the penetrating hole 106a of attached object 106 has a shape to fit the circumference of metal tube 104. The inlet of penetrating hole 106a through which the metal tube 104 is inserted is, as shown in FIG. 3A, formed to have a taper so as to facilitate the insertion of metal tube 104. Beside the penetrating hole 106a, there is formed the screw hole 106b into which the screw 112 to secure the flange 105 is fitted. The flange 105 is electrically connected through the metal tube 104 with the shield layer 103 and, therefore, the cable 100 is grounded by securing the flange 105 to the screw hole 106b of attached object 106 with the screw 112.

Thus, the terminal structure of cable with shield layer of the embodiment is composed of: the metal tube 104 that one end thereof is inserted between the insulation 102 and the shield layer 103 and has the flange 105 to be secured to the attached object 106 with screw; the metal sleeve 107 that is disposed on the shield layer 103 and is fastened to secure the shield layer 103 to one end of the metal tube 104; the O-ring 111 that is attached on the circumference of part of the metal tube 104 where the metal tube 104 is inserted to the penetrating hole 106a of attached object 106; and the heat shrinkage tube 109 that is disposed on the metal tube 104, the shield layer 103 through the metal sleeve 107 and the jacket 101 and has the hot-melt layer 108 which is formed at the inside of the heat shrinkage tube 109 and is solidified by heat in the heating and shrinkage.

Thus, by using the terminal structure composed of the metal tube 104 with the flange 105, the metal sleeve 107, the O-ring 111 to form the waterproof structure while closely contacting the wall of penetrating hole 106a and the heat shrinkage tube 109 that is disposed on the metal tube 104, the shield layer 103 and the jacket 101 and has the hot-melt layer 108 which is formed inside the heat shrinkage tube 109 and is solidified by heat in the heating and shrinkage, the number of parts is decreased as compared to that of conventional terminal structure of cable with shield layer, so that the structure can be simplified and the manufacturing cost can be reduced.

In attaching the cable 100 to the attached object 106, the metal tube 104 is inserted into the penetrating hole 106a of attached object 106 with the tip of cable 100 and then the flange 105 is secured to the attached object 106 with the screw 112. Thus, the attaching work can be completed in a short time while securing a given waterproof structure and grounding structure.

The waterproof structure of cable 100 protruding from the attached object 106 is given by covering the metal 104, which has an outer diameter equal to that of the jacket 101 of cable 100, as well as the jacket 101 with the heat shrinkage tube 109. Therefore, the outer diameter of portion protruding from the attached object 106 can be reduced.

In some types of conventional terminal structure of cable with shield layer, a rubber plug and a wire spacer are inserted aligned along the longitudinal direction of cable 100 within the housing protruding from the attached object 106 so as to give a waterproof structure. However, the terminal structure of the embodiment does not use the rubber plug and wire spacer. Therefore, the length from the wall of attached object 106 to the end of housing (metal tube 104) can be shorter than that in the conventional type.

Furthermore, by thermally shrinking the heat shrinkage tube 109 while bending the cable 100 protruding from the attached object 106 at around right angle, an elbow type can be formed without using special parts.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A terminal structure of cable with shield layer for attaching the cable to an attached object in water-tightness while grounding a shield layer formed on an insulation of the cable, comprising:

a metal tube one end of which is inserted between the insulation and the shield layer that are exposed by peeling a jacket of the cable and the other end of which is inserted into a penetrating hole in the attached object;

a metal sleeve that is disposed on the shield layer and is fastened to make the one end of the metal tube closely contact the insulation;

a heat shrinkage tube that covers the metal tube, the metal sleeve and the jacket and includes a hot-melt layer formed at the inside of the heat shrinkage tube, the hot-melt layer being solidified by heat in the heating and shrinkage of the heat shrinkage tube;

a shield member that is disposed on the other end of the metal tube such that the shield member closely contacts the wall of the penetrating hole to give a water-tightness therebetween, wherein the metal tube has an outer diameter equal to that of the jacket.

2. The terminal structure of cable with shield layer according to claim 1, wherein:

the metal tube includes a flange to be fixed to the attached object through a fixing member.

3. The terminal structure of cable with shield layer according to claim 1, wherein:

the heat shrinkage tube comprises a tube which is thermally shrunk while bending the cable protruding from the attached object at around right angle such that said terminal structure comprises an elbow type of terminal structure.

* * * * *